April 24, 1951        B. LITMAN        2,550,571

AXIAL-GAP MOTOR

Filed Aug. 6, 1948

WITNESSES:
Robert C. Baird
Thos. C. Groome

INVENTOR
Bernard Litman.
BY O. B. Buchanan
ATTORNEY

Patented Apr. 24, 1951

2,550,571

UNITED STATES PATENT OFFICE 2,550,571

AXIAL-GAP MOTOR

Bernard Litman, Bronx, N. Y., assignor to Westinghouse Electric Corporation, East Pittsburgh, Pa., a corporation of Pennsylvania Application August 6, 1948, Serial No. 42,801

4 Claims. (Cl. 172—120)

My invention relates to plural-primary, plural-gap dynamo-electric machines, and it has particular relation to axial-gap squirrel-cage motors.

Heretofore, axial-gap motors have been known, in which the airgap is disposed in a radial plane normal to the axis of the motor, so that the flux flows axially across the airgap. Such motors have been troubled, in general, by a flywheel-effect which is greater than is obtained in a conventional cylindrical-gap motor of comparable rating, and they have also been troubled by an excessively large end-thrust which necessitates the use of large thrust-bearings, while being not substantially better than the conventional motors in regard to weight and cooling-problems.

An object of my present invention is to provide a motor or other dynamo-electric machine having a pair of spaced stationary primary members, and a squirrel-cage rotor-member disposed therebetween, and separated therefrom by two airgaps, one on either side of the rotor-member, in combination with two primary windings, or the equivalent, one primary winding being disposed on the airgap side of each of the primary stationary members, and so excited as to tend to produce phase-oppositional fluxes which flow straight through the secondary or rotor-member, from one airgap to the other, so that the secondary or rotor-member does not have to have any magnetizable core, for carrying circumferentially flowing magnetic fluxes, but the magnetizable flux-carrying member of the secondary or rotor-member is made up entirely of a plurality of discrete, spaced sets of radially stacked tooth-punchings, which are completely or nearly completely magnetically disconnected from each other, and which comprise the secondary teeth.

A more specific object of my invention is to provide an axial-gap squirrel-cage motor of the double-gap type just described.

Another object of my invention is to provide a double-gap motor, not limited to airgaps of the axial flux-flow type, in which the magnetizable flux-carrying member of the rotor is made up entirely of a plurality of discrete, spaced stacks of tooth-punchings which are completely or nearly completely magnetically disconnected from each other, and which are composed of oriented magnetizable material having a preferred flux-carrying direction in substantial alignment with the direction of the flux which flows straight through these rotor-teeth from one airgap to the other, thereby overcoming a disadvantage of oriented magnetizable material, which has not found general use in dynamo-electric machines, because previous machines have in general involved non-rectilinear flux-flow paths.

With the foregoing and other objects in view, my invention consists in the structures, combinations, systems, parts and methods of assembly and design, hereinafter described and claimed, and illustrated in the accompanying drawing, wherein:

Figure 1:
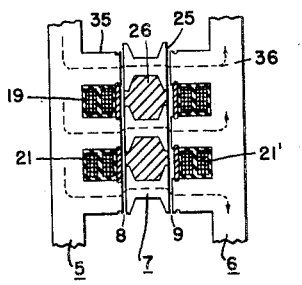
Figure 1 is a diagrammatic fragmentary developed view of a cylindrical section through my motor, the section-cylinder being indicated at I—I in Figs. 3 and 4.

I have shown my invention embodied in the form of an axial-gap squirrel-cage motor comprising a pair of axially spaced primary stator-members 5 and 6, and a rotor-member 7 disposed therebetween and separated therefrom by two axial airgaps 8 and 9, one on either side of the rotor-member 7. The rotor-member 7 is mounted on a shaft 11. The two airgaps 8 and 9 are disposed in axially spaced parallel radial planes which are at right angles to the shaft 11, so that the flux flows axially across these two airgaps 8 and 9.

The two primary-stator members 5 and 6 are mounted within a common frame which is diagrammatically shown as comprising two end-brackets 12 and 13, which are joined to the respective ends of an outer frame-ring 14. The brackets 12 and 13 carry bearings 15 and 16, which are illustrated as being of the ball-bearing type, for rotatably supporting the shaft 11. The two primary members 5 and 6 are alike so that a description of one will suffice for both. Each of these members comprises a stator-core 17 or 17′, which is made up of spirally wound magnetizable sheet-material, the back end of which is carried by its associated bracket 12 or 13 as the case may be, while the front end of the core 17 is slotted, as shown at 19, to carry a primary winding 21 or 21′, which is supported near the adjacent airgap 8 or 9 as the case may be.

The rotor-member 7 may be mounted on a rotor-spider 23 which is carried by the shaft 11, and which supports the inner end-ring 24 of a squirrel-cage secondary-member which will be subsequently described more in detail. A distinctive feature of my invention is that the rotor-member 7 has a magnetizable flux-carrying member which is made up of a plurality of discrete, spaced, sets of radially stacked tooth-punchings 25 which are completely or nearly completely magnetically disconnected from each other, and which carry flux in an axial direction, from one of the radial-plane airgaps 8 to the other radial-plane airgap 9. The squirrel-cage winding consists of axially-extending squirrel-cage bars 26, occupying the spaces between the rotor-teeth 25, these bars being connected, at their ends, to the inner end-ring 24 and to an outer end-ring 27, respectively, of the squirrel-cage winding. Preferably, the squirrel-cage winding, including the bars 26 and the two end-rings 24 and 27, are cast in a single integral piece, which, at least in the smaller motor-ratings, will have sufficient mechanical strength to constitute the means for holding the various parts of the rotor-member together.

It is a feature of my invention that the magnetic flux which is produced by the stator-windings 21 and 21', respectively, shall flow axially across the two airgaps 8 and 9, and substantially straight axially through the secondary-teeth 25, so that there is no circumferential rotor-flux flow, the only circumferential flux-flow in the motor being in the rear portion of the respective stator cores 17 and 17', back of the primary windings 21 and 21', respectively. This straight-through axial flux-flow is indicated in Fig. 1, which also indicates the fact that the number of rotor-teeth 25 is, in general, slightly different from the number of primary-teeth 35, as is customary in induction-motor designs.

In order that the magnetic flux may flow axially, substantially straight through the rotor-member 7, it is necessary for the two primary windings 21 and 21' to be so energized as to produce phase-oppositional fluxes, so that a primary north-pole is formed, at the airgap 8, at the same time when a primary south-pole is formed axially opposite thereto, on the airgap 9, the lines of force being as indicated at 36 in Fig. 1.

Figure 2:
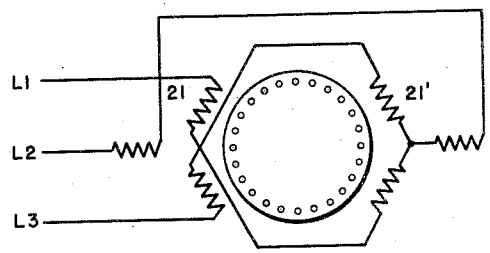
Fig. 2 is a diagrammatic view of circuits and apparatus, illustrating my invention and showing the electrical connections of the two primary windings.
Figure 3:
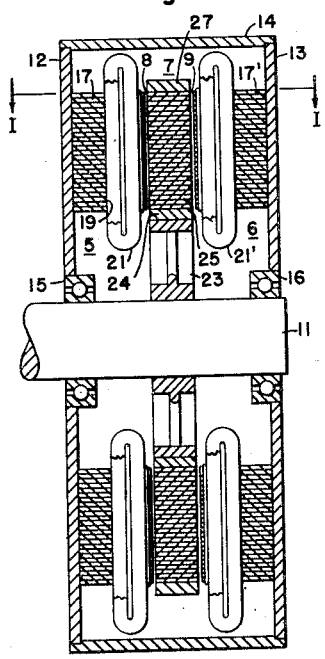
Fig. 3 is a somewhat diagrammatic longitudinal sectional view of my motor in an illustrative form of embodiment.
Figure 4:
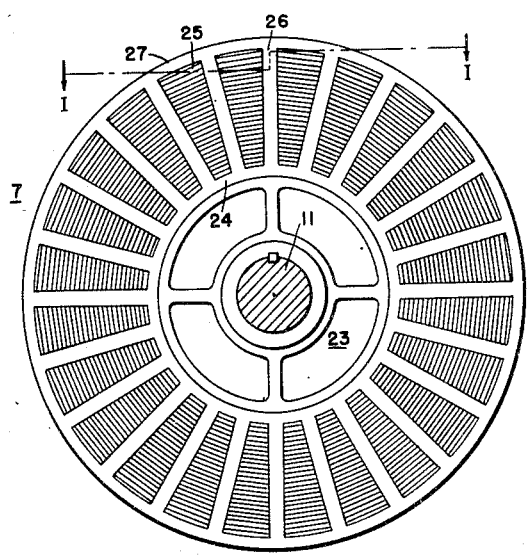
Fig. 4 is an end-view of the rotor-member alone.

Fig. 2 shows diagrammatically a series electrical connection for the corresponding phases of the two primary windings 21 and 21'. A 3-phase primary is indicated, supplied by line-conductors L1, L2 and L3, and the corresponding phases of the two windings are connected in series with each other, so as to produce the oppositional fluxes which flow axially through the secondary teeth, from one airgap to the other, as indicated in Fig. 1.

It will be noted that the magnetic attraction between the stators and the rotor, at the two airgaps 8 and 9, will be equal and opposite to each other, so that there will be no resultant end-thrust, of any material magnitude, operating on the rotor-member as a result of these magnetic attractions. It will further be noted that the use of a common rotor-member 7, for the two stator-members 5 and 6, with axially flowing flux in the rotor-member, produces a motor in which no rotor-core is needed, using the term "core" in the sense of a magnetizable member which carries circumferential flux, or flux from the back of one tooth to the back of the next tooth. I thus save not only the rotor-core material, but also the rotor-core space, so that my rotor-member 7 has a relatively short axial length. Furthermore, the cast squirrel-cage member 24—26—27 will usually be made of cast aluminum, which still further reduces the rotor-weight, thus producing a motor having an extremely low flywheel-effect, making the motor particularly useful in services requiring frequent starting and stopping.

It will still further be noted that I have provided a motor in which every bit of the magnetizable material which is used in the rotor-member 7 is in the form of flat tooth-punchings 25, and each of these punchings carries flux, in a substantially straight line, from one end of the punching to the other, this flux-direction being parallel with the rotor-shaft 11. Since the flux flows rectilinearly through the rotor tooth-punchings 25, it is, therefore, possible to use one of the oriented silicon steels, for the rotor tooth-punchings 25, or, in general, an oriented magnetizable material having a preferred flux-carrying direction in substantial alignment with the direction of flux-flow therethrough.

The result of the foregoing and other advantages is a motor which is phenomenally small for a given rating, which has a phenomenally low flywheel-effect, and substantially no thrust-bearing problem, besides having the generally recognized advantages of axial-gap motors, which will adapt these motors to such services as oil-well drives, and the so-called bracket-mountings for individual machine-drives.

While I have illustrated my invention in but a single illustrative form of embodiment, I wish it to be understood that the general design-principles of my invention are susceptible of embodiment in other forms, besides being susceptible of various changes in the way of additions, omissions, and the substitution of equivalents. For example, in the description, the terms primary and secondary (or squirrel-cage) could be interchanged, or the terms stationary and rotor could be interchanged. I desire, therefore, that the appended claims shall be accorded the broadest construction consistent with their language.

I claim as my invention:

1. A dynamo-electric machine comprising a rotatable machine-part and a stationary machine-part, one of said machine-parts comprising two spaced magnetizable members, and the other one of said machine-parts comprising an intermediate magnetizable member which is disposed between said two spaced magnetizable members with airgaps therebetween; each of said two spaced magnetizable members being a cylindrical core-member having slots, and teeth between the slots, on its airgap side, and having a continuous magnetizable portion for carrying flux circumferentially around said member at a point back of said teeth, away from the airgap side; windings carried by said slots, and connections for so energizing the windings of the two spaced magnetizable members as to cause flux to traverse the two airgaps, flowing substantially straight through said intermediate magnetizable member; said intermediate magnetizable member being made up of a plurality of discrete spaced magnetizable teeth extending in the direction of flux-flow.

2. An induction motor constructed as defined in claim 1, characterized by having a secondary winding carried by the discrete teeth of said intermediate member, and further characterized by the number of teeth of said intermediate member being different from the number of teeth of said core-members.

3. A squirrel-cage motor constructed as defined in claim 1, characterized by having a squirrel-cage winding carried by the discrete teeth of said intermediate member, and further characterized by the number of teeth of said intermediate member being different from the number of teeth of said core-members.

4. An axial-gap dynamo-electric machine constructed as defined in claim 1, characterized by the two spaced magnetizable members being spaced in an axial direction, each consisting of a spirally wound annular-shaped laminated magnetizable core, and each of said airgaps being an axial airgap.

BERNARD LITMAN.

REFERENCES CITED

The following references are of record in the file of this patent:

UNITED STATES PATENTS

| Number | Name | Date |
|---|---|---|
| 570,914 | Dorman | Nov. 10, 1896 |
| 1,605,796 | Tanzler | Nov. 2, 1926 |
| 1,829,686 | Swendsen | Oct. 27, 1931 |
| 2,479,589 | Parker | Aug. 23, 1949 |

FOREIGN PATENTS

| Number | Country | Date |
|---|---|---|
| 509,726 | Great Britain | July 20, 1939 |